United States Patent
Krasowski et al.

(10) Patent No.: US 9,660,680 B1
(45) Date of Patent: May 23, 2017

(54) APPARATUS AND METHOD FOR COMMUNICATION OVER POWER LINES

(71) Applicant: The United States of America as represented by the Administrator of the National Aeronautics and Space Administration, Washington, DC (US)

(72) Inventors: Michael J. Krasowski, Chagrin Falls, OH (US); Norman F. Prokop, South Euclid, OH (US); Lawrence C. Greer, III, Avon, OH (US); Jennifer M. Nappier, Bay Village, OH (US)

(73) Assignee: The United States of America as Represented by the Administrator of National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 14/815,189

(22) Filed: Jul. 31, 2015

Related U.S. Application Data

(63) Continuation of application No. 13/218,874, filed on Aug. 26, 2011, now Pat. No. 9,142,961.

(51) Int. Cl.
*H04B 1/38* (2015.01)
*A61N 1/08* (2006.01)

(52) U.S. Cl.
CPC .................................... *H04B 1/38* (2013.01)

(58) Field of Classification Search
CPC ........................................................ A61N 1/08
USPC ..................................................... 307/3, 151
See application file for complete search history.

(56) References Cited

U.S. PATENT DOCUMENTS

| | | | |
|---|---|---|---|
| 5,031,082 | A | 7/1991 | Bierend |
| 5,278,862 | A | 1/1994 | Vander Mey |
| 5,574,748 | A | 11/1996 | Vander Mey et al. |
| 5,684,826 | A | 11/1997 | Ratner |
| 6,275,144 | B1 | 8/2001 | Rumbaugh |
| 6,950,010 | B2 | 9/2005 | Aisa |
| 6,995,658 | B2 | 2/2006 | Tustison et al. |
| 7,027,483 | B2 | 4/2006 | Santhoff et al. |
| 7,183,900 | B2 | 2/2007 | Sullivan |
| 7,689,130 | B2 | 3/2010 | Ashdown |
| 7,912,377 | B2 | 3/2011 | Koga |
| 9,142,961 | B1 * | 9/2015 | Krasowski ............... H02J 3/02 |
| 2005/0213647 | A1 | 9/2005 | Zhang |
| 2008/0056338 | A1 | 3/2008 | Yaney et al. |
| 2009/0310973 | A1 | 12/2009 | Broyde et al. |
| 2010/0118928 | A1 | 5/2010 | Yu |
| 2010/0316237 | A1 | 12/2010 | Elberbaum |
| 2011/0031814 | A1 | 2/2011 | Giesler |
| 2011/0043374 | A1 | 2/2011 | Bannister et al. |
| 2011/0064126 | A1 | 3/2011 | Ishiko |

* cited by examiner

*Primary Examiner* — Robert Deberadinis
(74) *Attorney, Agent, or Firm* — Robert H. Earp, III (57) ABSTRACT

An apparatus and method are provided for communicating over power lines. The apparatus includes a coupling modem that is situated between a power line and a device. The coupling modem is configured to demodulate a signal received from the power line into a sine signal and a cosine signal. The coupling modem is also configured to modulate a communicated bit stream received from the device into a transmitted signal in order to impose the transmitted signal onto the power line.

20 Claims, 6 Drawing Sheets

APPARATUS AND METHOD FOR COMMUNICATION OVER POWER LINES

CROSS-REFERENCE TO RELATED APPLICATION

This application is a continuation of co-pending U.S. patent application Ser. No. 13/218,847, entitled "Apparatus and Method for Communication Over Power Lines", filed on Aug. 26, 2011, and Issuance is pending as U.S. Pat. No. 9,142,961.

ORIGIN OF THE INVENTION

The invention described herein was made by an employee of the United States Government and may be manufactured and used by or for the Government for Government purposes without the payment of any royalties thereon or therefore.

FIELD

The present invention relates to an apparatus and method for communicating data over a pre-existing power line.

BACKGROUND

Sensors and instrumentation are needed to monitor processes of systems strung along power lines that supply current to those systems. Examples of such systems include In-Situ Health Monitoring and communication within and amongst individual solar cell subpanels within a power producing solar array on earth, in orbit, or in deep space and on other celestial bodies.

SUMMARY

Certain embodiments of the present invention may provide solutions to the problems and needs in the art that have not yet been fully identified, appreciated, or solved by current systems that transmit and receive data over power lines.

For instance, a modulator/demodulator (modem) can be placed between an output and an input of a serial device, such as a universal or asynchronous receiver and/or transmitter (UART), or can replace a line driver for a controller area network (CAN) transceiver using existing power lines. This allows for a more robust and easily expandable system by taking advantage of the existing power lines that feed other devices.

In accordance with an embodiment of the present invention, an apparatus is provided. The apparatus includes a coupling modem that is situated between a power line and a device. The coupling modem is configured to demodulate a signal received from the power line into a sine and a cosine signal, and configured to modulate a signal received from the device onto the power line.

In accordance with another embodiment of the present invention, a method is provided. The method includes demodulating a signal received from the power line into a sine and a cosine signal and modulating a signal received from the device onto the power line.

In accordance with yet another embodiment of the present invention, an apparatus is provided. The apparatus includes a demodulator that is configured to receive a signal from a power line and demodulate the signal into a sine signal and a cosine signal using a quadrature clock. The apparatus also includes a modulator that is configured to receive a bit stream of data and a clock signal to generate a transmission signal for transmission onto the power line.

BRIEF DESCRIPTION OF THE DRAWINGS

For a proper understanding of the invention, reference should be made to the accompanying figures. These figures depict only some embodiments of the invention and are not limiting of the scope of the invention. Regarding the figures.

DETAILED DESCRIPTION OF THE EMBODIMENTS

It will be readily understood that the components of the present invention, as generally described and illustrated in the figures herein, may be arranged and designed in a wide variety of different configurations. Thus, the following detailed description of the embodiments of an apparatus, a system, a method, and a computer readable medium, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, the usage of "certain embodiments," "some embodiments," or other similar language, throughout this specification refers to the fact that a particular feature, structure, or characteristic described in connection with the embodiment may be included in at least one embodiment of the present invention. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more embodiments.

Embodiments of the present invention pertain to an apparatus and method for communicating over power lines. For instance, the apparatus and method provide for an effective modulation and asynchronous demodulation of on-off-keyed (OOK) bit streams from a serial device onto and off of power lines. In other words, the apparatus may include a modem that can be placed between an output and input of a serial device (e.g., a universal asynchronous receiver/transmitter (UART)) or replace a line driver for a controller area network (CAN) transceiver. This allows for a more robust and easily expandable system by taking advantage of existing power lines on a target system. Because existing power lines are utilized, electronic components that require communication can be added to the target system without the need to add additional wiring for communications.

Because OOK modulation is generally the simplest form of amplitude shift keying (ASK), the embodiments of the present invention can also be applied to systems using ASK and non-ASK systems such as phase shift keyed (PSK) devices. In some embodiments, logic zeros (0) are used in the OOK bit stream as a frequency burst and transmit logic ones (1) for an absence of a burst (no signal). In this manner, this apparatus can, as previously mentioned, replace the physical layer of a CAN system.

In another embodiment, the apparatus may use, instead of electrical impulses imparted onto a power line, sonic energy (such as for an underwater application using communications analogous to sonar, or sound through ground or air) or for an in vitro device for medical applications such as intercommunication between implanted neuroprosthetic devices, etc.

In other embodiments, the apparatus may use optical transmission and can be operated using an optical fiber as the communications backbone and light emitting diodes (LED) or laser diodes and photodetectors as the output/input devices. Or, the apparatus can operate simply using light emitting diodes and photodetectors with transmission through the air. A person of ordinary skill in the art will appreciate that modulation/demodulation over a laser in air is possible.

Since the modulation frequency is selectable, and since discrimination is high, the apparatus can easily be used to execute frequency-hopping algorithms and allow for the simultaneous operation of multiple networks operating at different carrier clock frequencies on the same power line.

Figure 1:
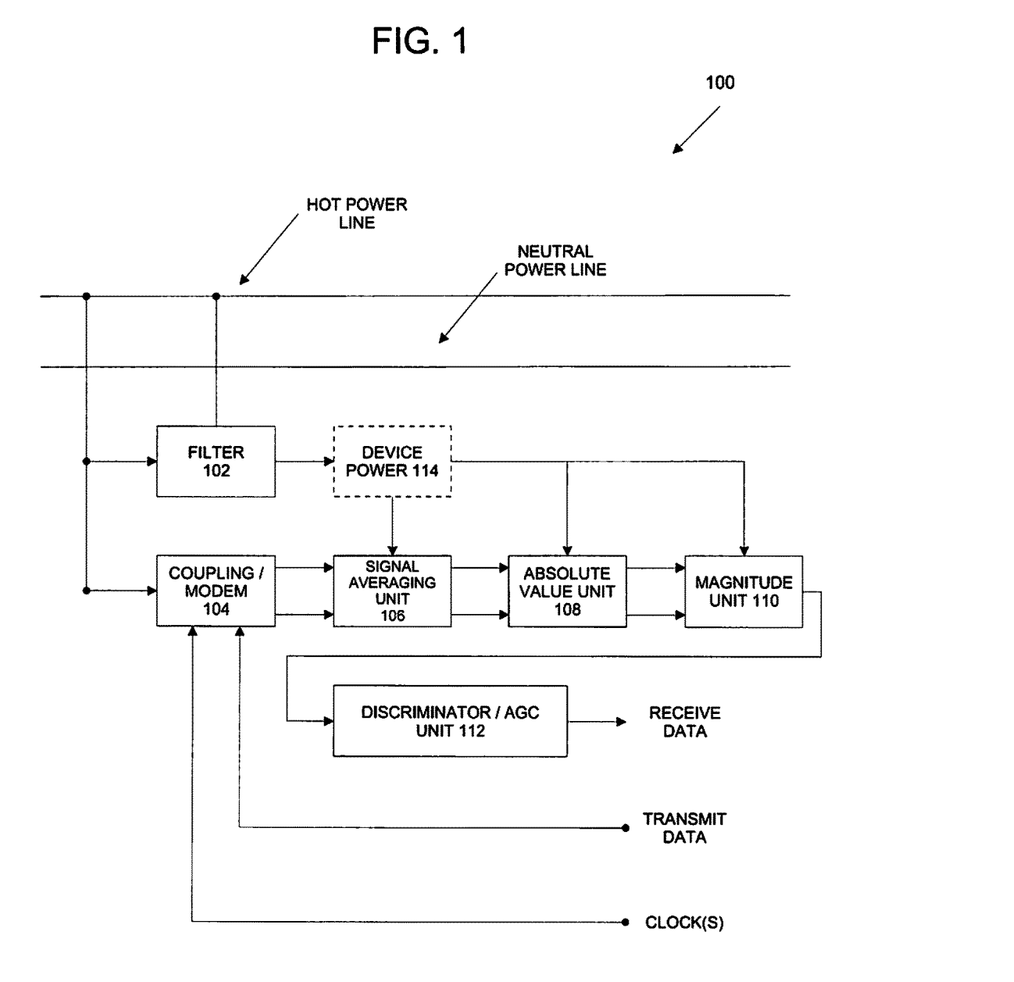
FIG. 1 illustrates an apparatus for communication over power lines, in accordance with an embodiment of the present invention.

FIG. 1 illustrates an apparatus 100 for communication over power lines, in accordance with an embodiment of the present invention.

Apparatus 100 includes, but is not limited to, a filter 102, a coupling modem 104, a signal averaging unit 106, an absolute value unit 108, a magnitude unit 110, a discriminator/automatic gain control (AGC) unit 112, a hot power line and a neutral power line. In one or more embodiments, the hot power line is configured to power a host device (not shown) and communicate data (e.g., transmit and receive a bit stream) to and from the host device.

Filter 102 is operatively connected to the hot and neutral power lines and a power device 114. Power device 114 may provide power to signal averaging unit 106, absolute value unit 108, and magnitude unit 110. Filter 102 conditions (or regulates) power for power device 114 and functions as impedance to the transmitted and received data signals. In other embodiments, depending on the system's configuration, filter 102 may be an all pass device, or may be a wire inductance device, voltage regulator, etc.

Figure 2:
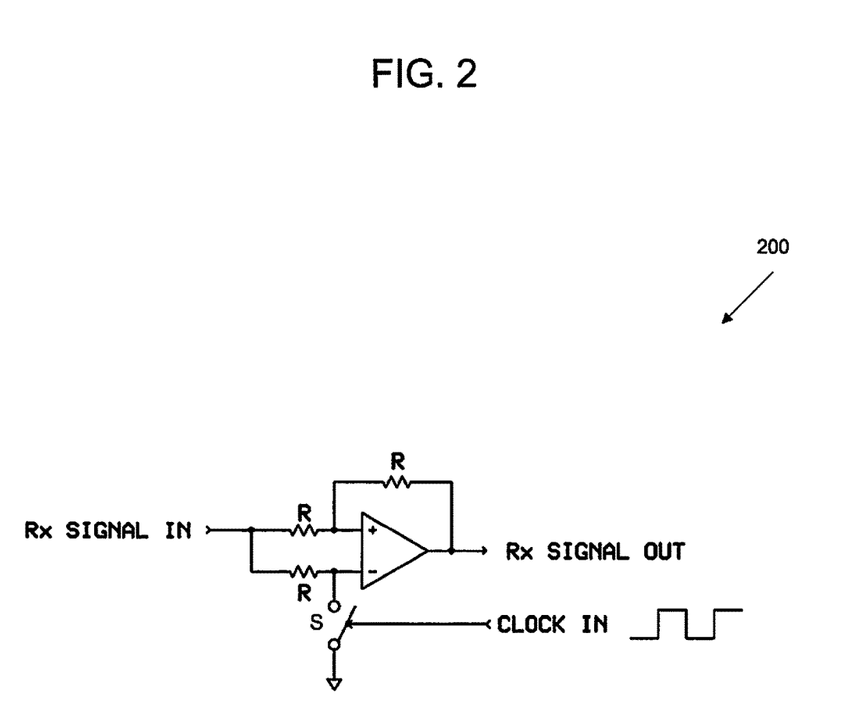
FIG. 2 illustrates a demodulator for demodulating a received signal, in accordance with an embodiment of the present invention.
Figure 3:
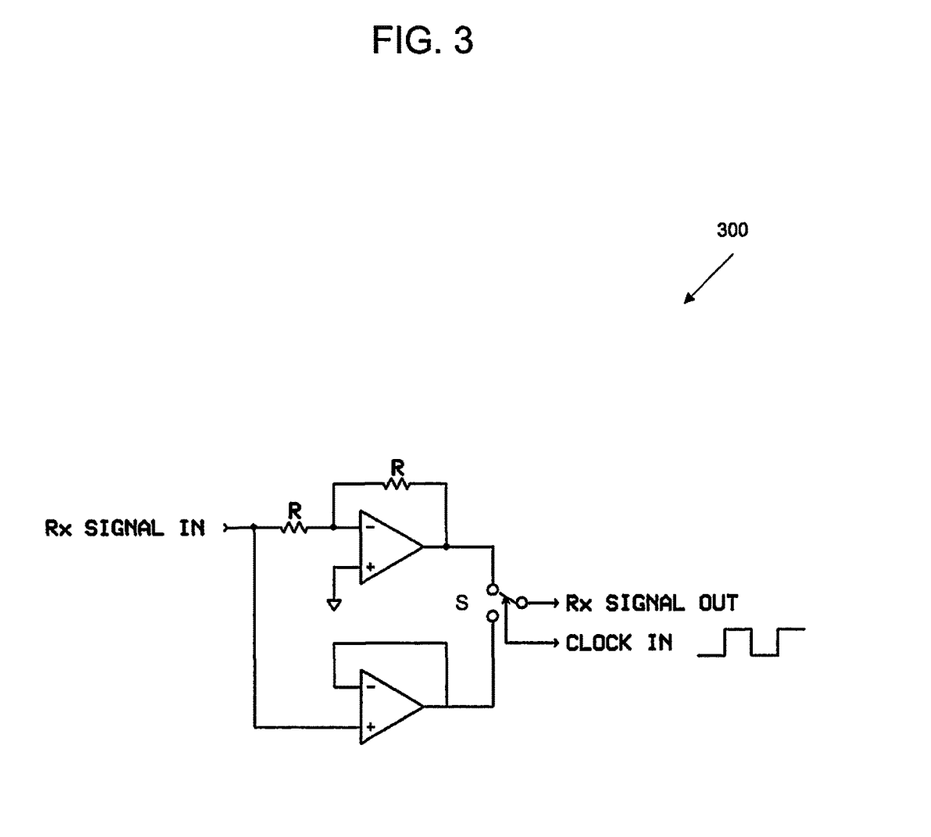
FIG. 3 illustrates a demodulator for demodulating a received signal, in accordance with an embodiment of the present invention.
Figure 4:
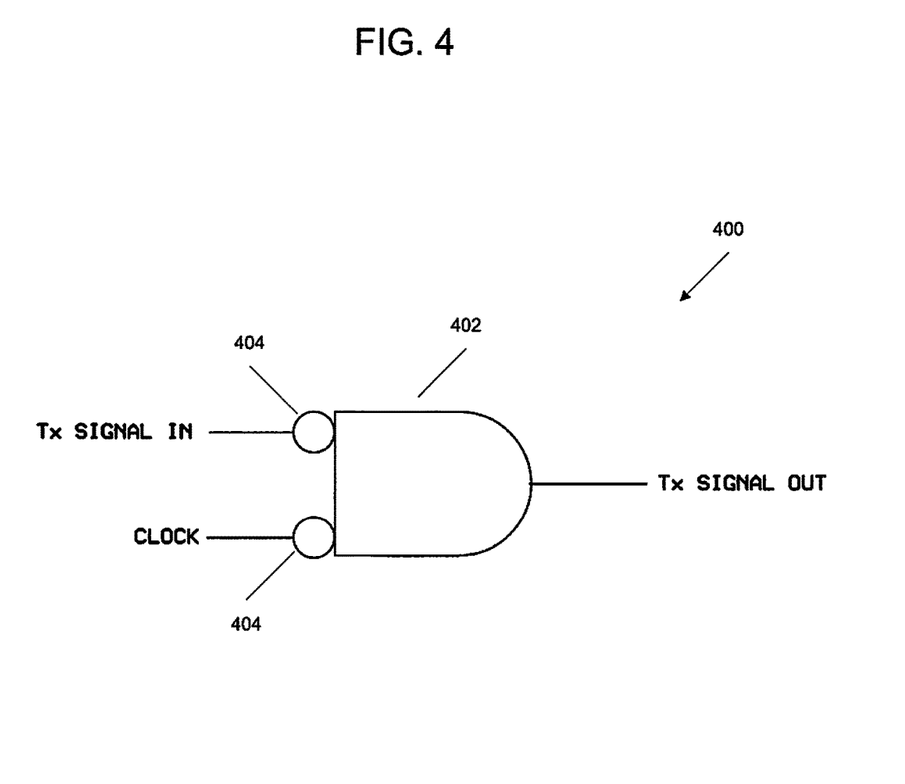
FIG. 4 illustrates a modulator for modulating a transmitted signal onto a power line, in accordance with an embodiment of the present invention.

Coupling modem 104 is operatively connected to the hot power line, signal averaging unit 106 and the host device. Coupling modem 104 is configured to modulate data signals received from the host device and demodulate data signals received from the hot power line. FIGS. 2 and 3 illustrates two different embodiments of coupling modem 104 to demodulate the data signals received from the hot power line, and FIG. 4 illustrates an embodiment of coupling modem 104 to modulate the data signals received from the host device.

In this embodiment, an incoming (or received) data signal is capacitively coupled to the modem. When an outgoing (or transmitted) data signal is driven in a push-pull fashion, capacitive coupling can be utilized. When the outgoing signal is single ended, i.e., a simple open collector/open drain output, then resistive coupling can be utilized. Resistive coupling is utilized for high temperatures, where push-pull topographies may be nonexistent.

It should be appreciated that depending on the configuration of apparatus 100, a band limiting or rate limiting filter may be used between the coupling element and the modem to block interference from other signals on the power lines. Preamplification may also be desirable in such instances. It should also be noted that the coupling modem 104 is sectioned to realize modulation for transmission and demodulation for reception of the communicated data signals. For example, coupling modem 104 includes a demodulator and a modulator. See, for example, FIGS. 2-4.

Signal averaging unit 106 receives the demodulated signals (e.g., Rx Signal OUT sine and Rx Signal OUT cosine) from coupling modem 104 to average the demodulated signals. For instance, signal averaging unit 104 is configured to compute the average of the Rx Signal OUT sine and Rx Signal OUT cosine to create a direct current (DC) value or signal. In other words, the demodulator described below and signal averaging unit 106 are configured to pass frequencies at the sine and cosine clock frequencies and block frequencies that are not at the sine and cosine clock frequencies.

For example, in signal averaging unit 106, an alternating current (AC) signal carrier with average peak magnitude m in phase with the sine component can be completely out of phase with the cosine clock. As a result, the output of the sine component of the demodulator may yield a positive pulse train with average value m and the cosine component may produce a zero signal. However, an AC signal carrier with average peak magnitude m that is 180° out of phase with the sine component may also be completely out of phase with the cosine clock. Thus, the output of the sine component of the demodulator may yield a negative pulse train with average value −m (or a magnitude of m) and the cosine may produce a zero signal.

It should be appreciated that input signals at all other phase relationships can share energy between the sine and cosine components of the demodulator and, after averaging, the sums of their absolute values can equal and have a magnitude of m. As a result, the incoming signal can be discriminated. All signals of frequencies greater than or less than the clock frequency can appear at the outputs of the sine and cosine components of the demodulator to have magnitudes of zero. However, the speed at which the signals go to zero as a function of frequency difference from the clock frequency is dependent on the quality factor of signal averaging unit 106.

In other words, signal averaging unit 106, as shown in FIG. 1, has a high discrimination and maps the incoming frequency of interest to DC. This feature allows for multiple nets running at different frequencies to operate simultaneously on the same power line without interference. In other embodiments, signal averaging unit 106 may be a single resistor/capacitor, low pass circuit, or a high order band pass filter, which may be continuous or clocked.

It should be noted that the relationship between the two signals reveals phase information, and if the phase of the input signal abruptly changes, as in PSK, then this transition in phase is evident at this stage. Also, the above function may be realized in a discrete space through the use of an analog to digital conversion and subsequent digital signal processing.

Absolute value unit 108 receives the output signals from signal averaging unit 106 and calculates the absolute value of the signals. This function may be calculated in a number of ways in hardware and/or software, e.g., a precision rectifier. In other embodiments, absolute value unit 108 may be composed of diode based operational amplifiers and saturable operational amplifiers with no diodes.

Once the absolute values of the two signals (e.g., sine and cosine) are determined, the two signals are summed in an adder circuit (e.g., magnitude unit 110) to create a DC output with magnitude m for an alternating current (AC) input signal at the same frequency as the clock signal of average peak magnitude m.

This is the technique used in a fully analog processing front end. The above function may be realized entirely in a discrete space through the use of analog to digital conversion and subsequent digital signal processing. In this embodiment, magnitude calculations have been implemented to include $$\text{Magnitude} = \text{MAX}\{A,B\} \qquad \text{(Eq. 1)}$$

$$\text{Magnitude} = \text{MAX}\{A,B\} + 0.5 \times \text{MIN}\{A,B\} \qquad \text{(Eq. 2)}$$

$$\text{Magnitude} = \sqrt{A^2 + B^2} \qquad \text{(Eq. 3)}$$

$$\text{Magnitude} = A + B \qquad \text{(Eq. 4)}$$

where A is the absolute value of the average of the sine signal, and B is the absolute value of the average of the cosine signal. It should be appreciated that while each of the above magnitude calculations can be utilized, they do not represent an exhaustive set of possible magnitude calculations.

One of ordinary skill in the art will appreciate that in the case of transmitted zeros (dominant low), the output of magnitude unit 108 is m for a transmitted zero, and is near 0 (ground) for a transmitted one.

Discriminator/AGC unit 112 receives the DC output with magnitude m from magnitude unit 108. Discriminator/AGC unit 112 includes a comparator circuit that outputs a low when the input is greater than m/2. When the input is lower than m/2, discriminator/ACG unit 112 outputs a high. Hysteresis is indicated within the comparator circuit to reduce uncertainty and improve response. This allows the input signal to be converted to a bit stream of data, or received data.

Determining the threshold for the discriminator, that is, the value that the discriminator's input is compared to, may be performed manually or determined a priori through experimentation. The value can be automatically generated based on statistics on the incoming signal peak values. For instance, when the discriminator threshold value is fixed, the AGC analyzes the peak values of the incoming signal and adjusts a gain stage to amplify the signal from the magnitude calculator to a peak value about two times the threshold.

FIG. 2 illustrates a demodulator 200 for demodulating a received signal, in accordance with an embodiment of the present invention. Demodulator 200, which may be a coupling demodulator, includes a plurality of resistors R and a switch S, where plurality of resistors R are equal. Coupling demodulator 200 receives a signal at an input (Rx Signal In) and demodulates the received signal using a clock cycle. Because coupling demodulator 200 uses asynchronous demodulation, two square waves of a quadrature clock are used at the frequency of interest. For instance, depending on the quadrature clock (i.e., two clock streams that are 90 degrees out of phase with a 50 percent duty cycle), the received signal is outputted in its native form or inverted form. When switch S is open, the signal is multiplied by +1 at the frequency of interest, thus allowing the signal to pass through. However, when the switch is closed, the signal is multiplied by −1 at the frequency of interest, thus allowing the signal to be inverted.

FIG. 3 illustrates a demodulator 300 for demodulating a received signal, in accordance with an embodiment of the present invention. In this embodiment, coupling demodulator 300 includes a plurality of resistors R and a switch S. In this embodiment, when switch S is open, the signal is multiplied by +1 at the frequency of interest, thus allowing the signal to pass through. However, when the switch is closed, the signal is multiplied by −1 at the frequency of interest, thus allowing the signal to be inverted.

In some embodiments, separate clocks for sine and cosine are supplied by the application, though a single clock can be provided and, at the modem, the single clock can be converted into separate sine and cosine components through various means. The clocks can have a frequency many times greater than the baud rate of the communications bit stream. Stated another way, multiple cycles of the clock can occur for one bit period of the data. For example, 8 cycles of the clock can transition during one bit of data that is being transmitted.

FIGS. 2 and 3 illustrate two possible demodulators to implement the multiplication of the input signal with the sine (0°) and cosine (90°) square waves. Regardless of which demodulator is being utilized, for one state of clock in, Rx Signal Out=Rx Signal In, while for the other state, Rx Signal Out=−Rx Signal In, with the plurality of resistors R being equal.

It should be appreciated that the demodulators are not limited to the circuits shown FIGS. 2 and 3, but there may be other demodulators as would be readily appreciated by a person of ordinary skill in the art. Regardless of the circuitry, one circuit can be used for the sine (0°) component and another circuit can be used for the cosine (90°) component to yield two outputs from coupling modem 104, as shown in FIG. 1.

In an alternative embodiment, the above function may be realized entirely in a discrete space through the use of an analog-to-digital conversion and subsequent digital signal processing.

FIG. 4 illustrates a modulator 400 for modulating a transmitted signal onto a power line, in accordance with an embodiment of the present invention. Modulator 400 is configured to receive a communicated bit stream along with a clock signal and transform the communicated bit stream into a transmitted signal that can then be imposed on the power line. The transmitted communication bit stream signal may be generated by gating a clock frequency (e.g., a sine or cosine signal) with the actual bit stream. The resulting OOK signal can then be imparted onto the power line using the coupling technique described below.

In FIG. 4, the gate 402 represents a DeMorgan equivalent of a NOR gate with inverters 404. During a low state of a transmitted signal at input (Tx Signal In), the transmitted signal at output (Tx Signal Out) can toggle at the rate of the clock, such that the Tx Signal Out can be high when the clock is 0 and can be low when the clock is 1. For example, for Tx Signal In, the digital bit stream can have a 0 value as its current, and the clock can have a period much shorter than the period of a bit of data. It should be noted that the clock is imposed onto the power line for one state of the signal and suppressed for the other state of the signal. Also, the signal is the gate for the clock to be imposed onto the power line.

It should also be appreciated that the clock need not be inverted by this function (e.g., inversion function at input) nor does the Tx Signal Out have to be positive with respect to the input conditions. If a dominant low is not desired at the output, then inverter 404, which inverts Tx Signal In, may be removed from the logic.

In an alternative embodiment, if the above gate 402 was replaced by an exclusive OR or an exclusive NOR function, then the PSK of the bit stream at Tx Signal In can be present at Tx Signal Out.

Figure 5:
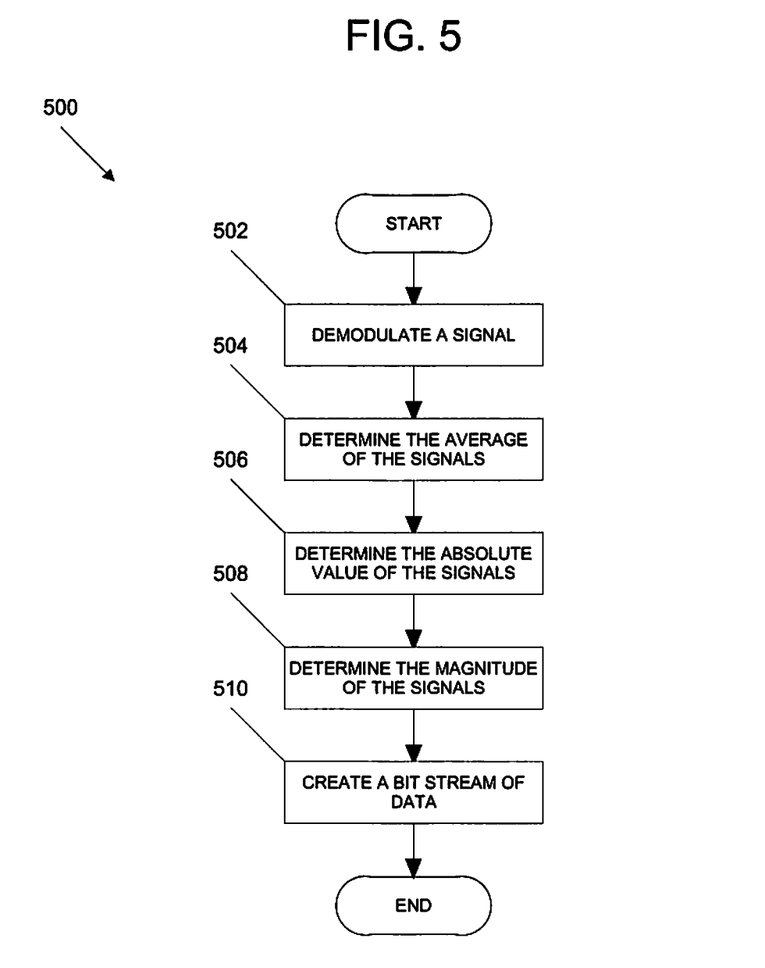
FIG. 5 illustrates a method for transmitting a signal from an existing power line to a host device, in accordance with an embodiment of the present invention.

FIG. 5 illustrates a method 500 for transmitting a signal from an existing power line to a host device, in accordance with an embodiment of the present invention. At 502, a signal received from a power line is demodulated into a sine signal and a cosine signal. At 504, direct current values of the sine and cosine signals are determined. At 506, the absolute values of the sine and cosine signals are determined. Based on the absolute values, the magnitude of the sine and cosine signals is determined at 508. At 510, based on the magnitude, a bit stream of data is created in order to transmit the data to the host device.

Figure 6:
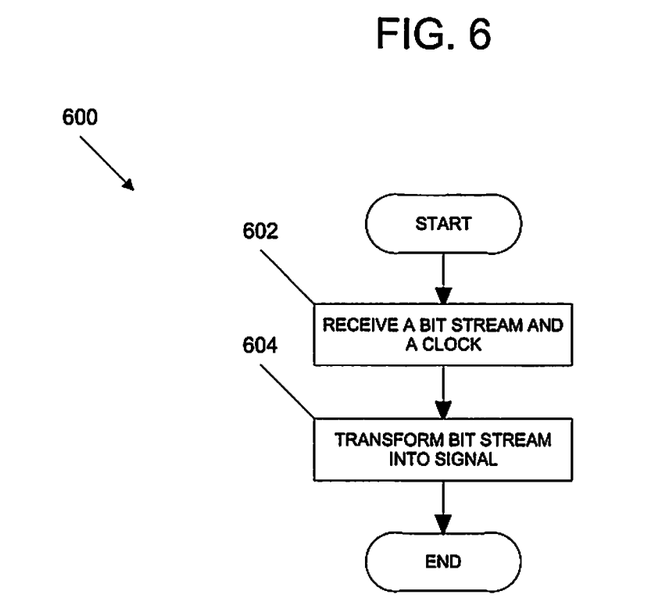
FIG. 6 illustrates a method for transmitting a signal received from a host device onto an existing power line, in accordance with an embodiment of the present invention

FIG. 6 illustrates a method 600 for transmitting a signal received from a host device onto an existing power line, in accordance with an embodiment of the present invention. At 602, a communicated bit stream and with a clock is received at the modem. At 604, the communicated bit stream is transformed into a transmitted signal using the clock cycle.

The method steps performed in FIGS. 5 and 6 may be performed by a computer program, encoding instructions for the nonlinear adaptive processor to perform at least the methods described in FIGS. 5 and 6, in accordance with an embodiment of the present invention. The computer program may be embodied on a computer readable medium. A computer readable medium may be, but is not limited to, a hard disk drive, a flash device, a random access memory, a tape, or any other such medium used to store data. The computer program may include encoded instructions for controlling the nonlinear adaptive processor to implement the methods described in FIGS. 5 and 6, which may also be stored on the computer readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, or an application specific integrated circuit ("ASIC").

Many distributed systems share common sensors and instruments along with a common power line supplying current to the system. A communication technique and circuit have been developed that allow for the simple inclusion of an instrument, sensor, or actuator node within any system containing a common power bus. Wherever power is available, a node can be added, which can then draw power for itself, its associated sensors and its actuators from the power bus all while communicating with other nodes on the power bus.

The technique modulates a DC power bus through capacitive coupling using OOK, and receives and demodulates the signal from the DC power bus through the same capacitive coupling. The circuit acts as serial modem for the physical power line communication. The circuit and technique can be made of commercially available components or be included in an ASIC design that allows for the circuit to be included in current designs with additional circuitry or embedded into new designs.

This device and technique moves computational, sensing, and actuation abilities closer to the source, and allows for the networking of multiple similar nodes to each other and to a central processor. This technique also allows for reconfigurable systems by adding or removing nodes at any time. The technique can do so using nothing more than the in situ power wiring of the system.

One having ordinary skill in the art will readily understand that the invention as discussed above may be practiced with steps in a different order, and/or with hardware elements in configurations that are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. An apparatus, comprising:
a modem situated between the flesh of a body and a device implanted within said body, the modem configured to:
demodulate a signal received from the flesh into a first signal and a second signal which are linearly and nonlinearly processed to create a bit stream for transmission to the device; and
modulate a bit stream received from the device into a transmitted signal in order to impose the transmitted signal through the flesh.

2. The apparatus of claim 1, wherein the modem comprises a demodulator and a modulator.

3. The apparatus of claim 2, wherein the demodulator comprises a plurality of resistors and a switch, and the demodulator is configured to demodulate the received signal into the first signal and the second signal using a clock cycle at frequencies of interest.

4. The apparatus of claim 3, wherein the plurality of resistors are equal.

5. The apparatus of claim 2, wherein the modulator comprises a gate and an inverter at an input of the gate, and the modulator is configured to receive the communicated bit stream from the device and generate the transmitted signal by gating a clock frequency.

6. The apparatus of claim 1, further comprising: a signal averaging unit configured to receive the first and the second signals from the modem and calculate direct current values of the first and second signals; an absolute value unit configured to receive the direct current values of the first and the second signals and determine absolute values of the first and second signals; and a magnitude unit configured to receive the absolute values of the first and second signals and determine a magnitude of the first and second signals.

7. The apparatus of claim 6, further comprising: a discriminator and automatic gain control unit configured to receive the magnitude of the first and the second signals and create a bit stream of data to be transmitted to the device.

8. A method, comprising:
demodulating, by a modem, a signal received from a device implanted within the flesh of a body into a first signal and a second signal which are linearly and nonlinearly processed to create a bit stream for transmission to a device; and
modulating a bit stream received from the device into a transmitted signal in order to impose the transmitted signal through the flesh.

9. The method of claim 8, wherein the demodulating of the received signal further comprises:
demodulating the received signal into the first signal and a second signal using a clock cycle at frequencies of interest.

10. The method of claim 8, wherein the modulating further comprises:
receiving the bit stream from the device and generating the transmitted signal by gating a clock frequency.

11. The method of claim 8, further comprising:
receiving, at a signal averaging unit, the first and the second signals from the modem; and
calculating direct current values of the first and second signals.

12. The method of claim 11, further comprising:
receiving, at an absolute value unit, the direct current values of the first and second signals; and
determining absolute values of the first and second signals.

13. The method of claim 12, further comprising:
receiving, at a magnitude unit, the absolute values of the first and second signals; and
determining a magnitude of the first and second signals.

14. The method of claim 8, further comprising:
receiving, at a discriminator and automatic gain control unit, the magnitude of the first and the second signals; and
creating a bit stream of data to be transmitted to the device.

15. An apparatus, comprising:
a demodulator configured to receive a signal from a device implanted within the flesh of a body and demodulate the signal into a first signal and a second signal using a quadrature clock; and
a modulator configured to receive a bit stream of data and a clock signal to generate a transmission signal for transmission through the flesh.

16. The apparatus of claim 15, wherein the demodulator further comprises:
a plurality of resistors that are equal; and
a switch configured to allow the first and the second signals to pass through when the switch is open and invert the first and the second signals when the switch is closed.

17. The apparatus of claim 15, wherein the quadrature clock comprises two clock streams that are 90 degrees out of phase with a 50 percent duty cycle.

18. The apparatus of claim 15, wherein the modulator comprises a gate with a first inverter and a second inverter at a front of the gate.

19. The apparatus of claim 18, wherein the first inverter is configured to receive the bit stream of data from the device, and the second inverter is configured to receive the clock signal from the device.

20. The apparatus of claim 15, wherein the modulator is configured to gate the clock signal with the bit stream in order to generate the transmission signal such that the transmission signal can be imparted onto the power line.

* * * * *